W. H. McCLELLAND, Jr.
RAILWAY SIGNALING.
APPLICATION FILED MAR. 13, 1918.

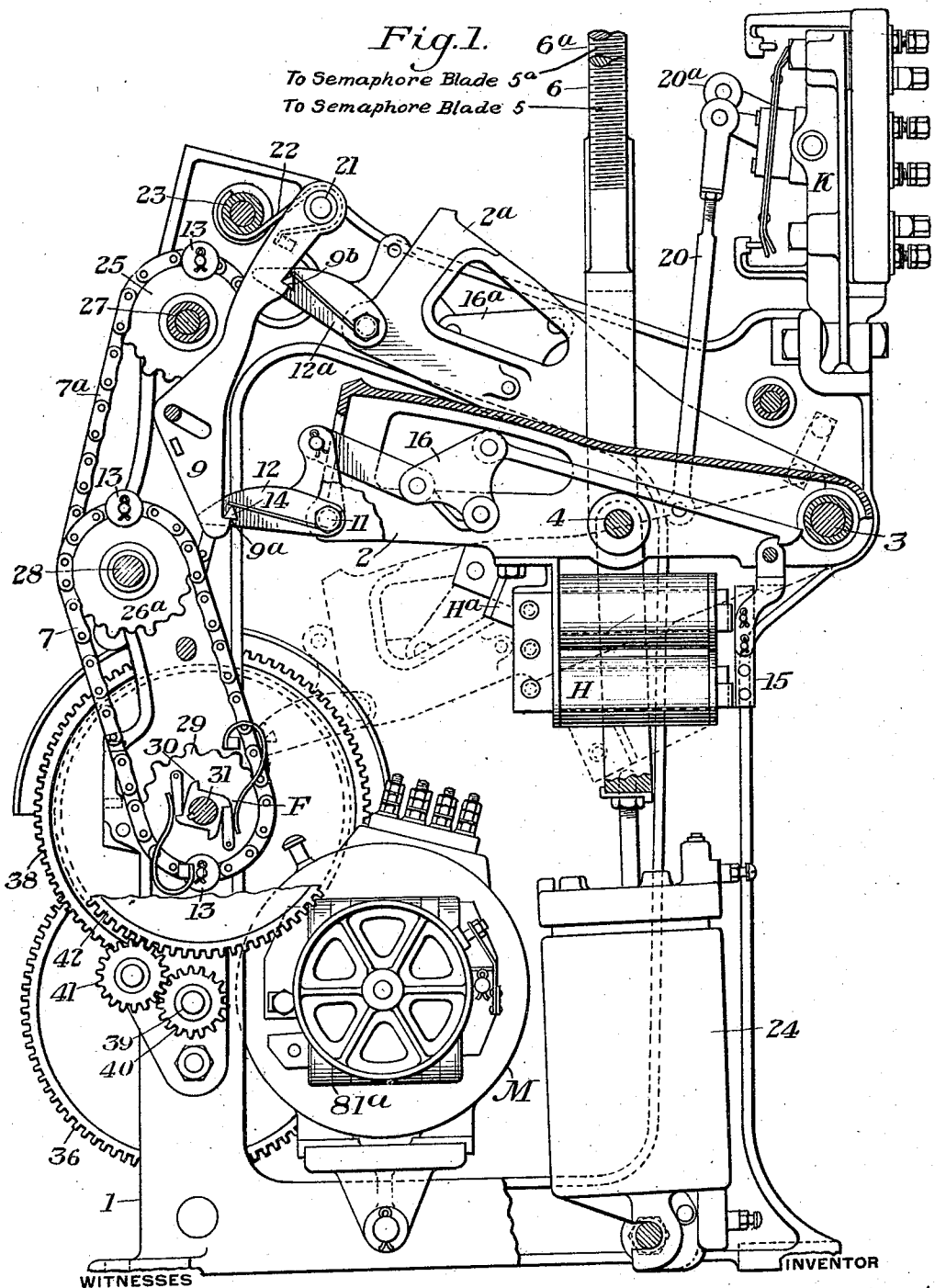

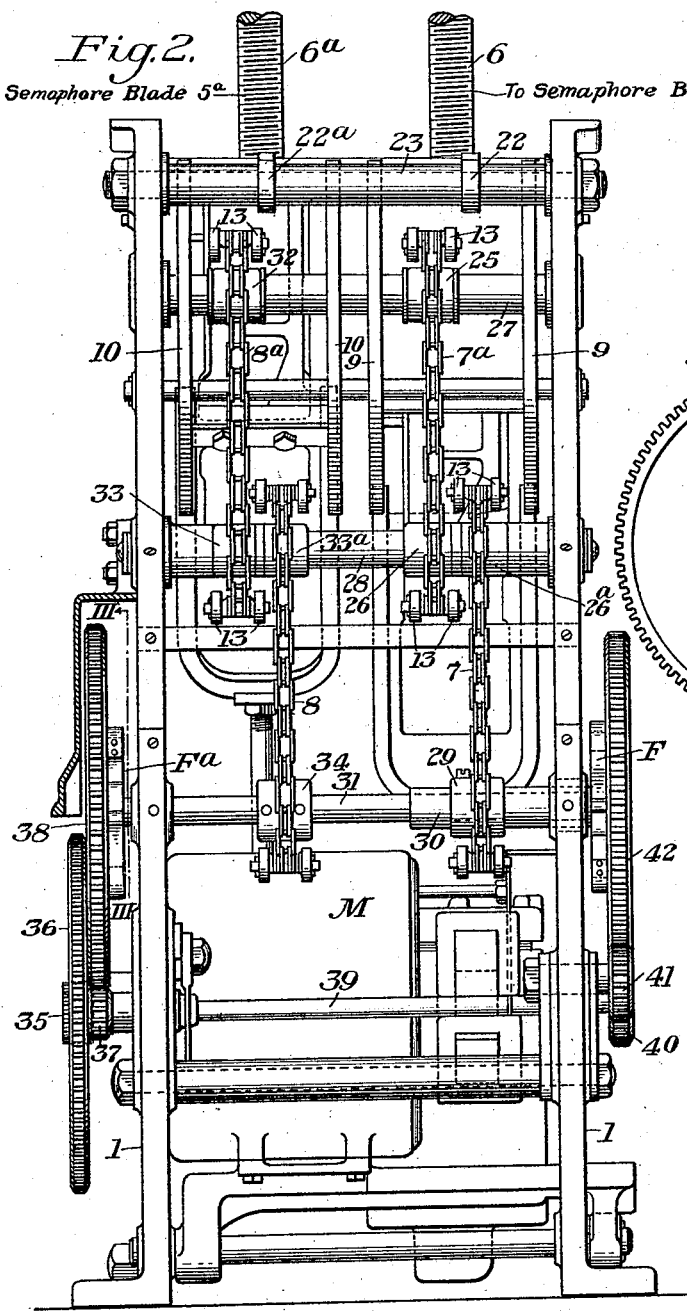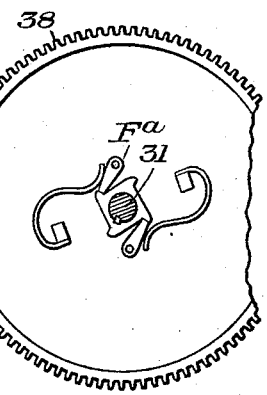

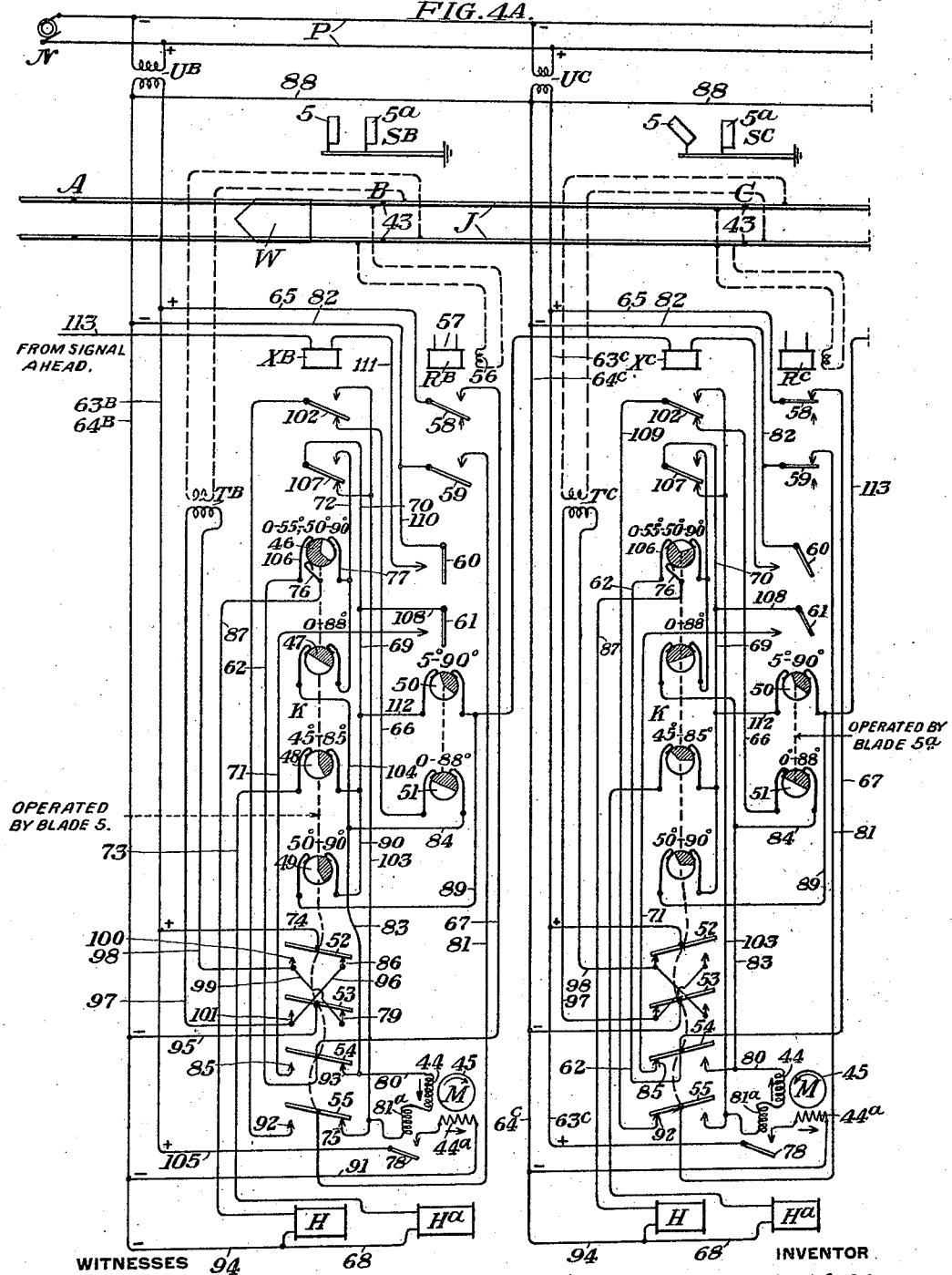

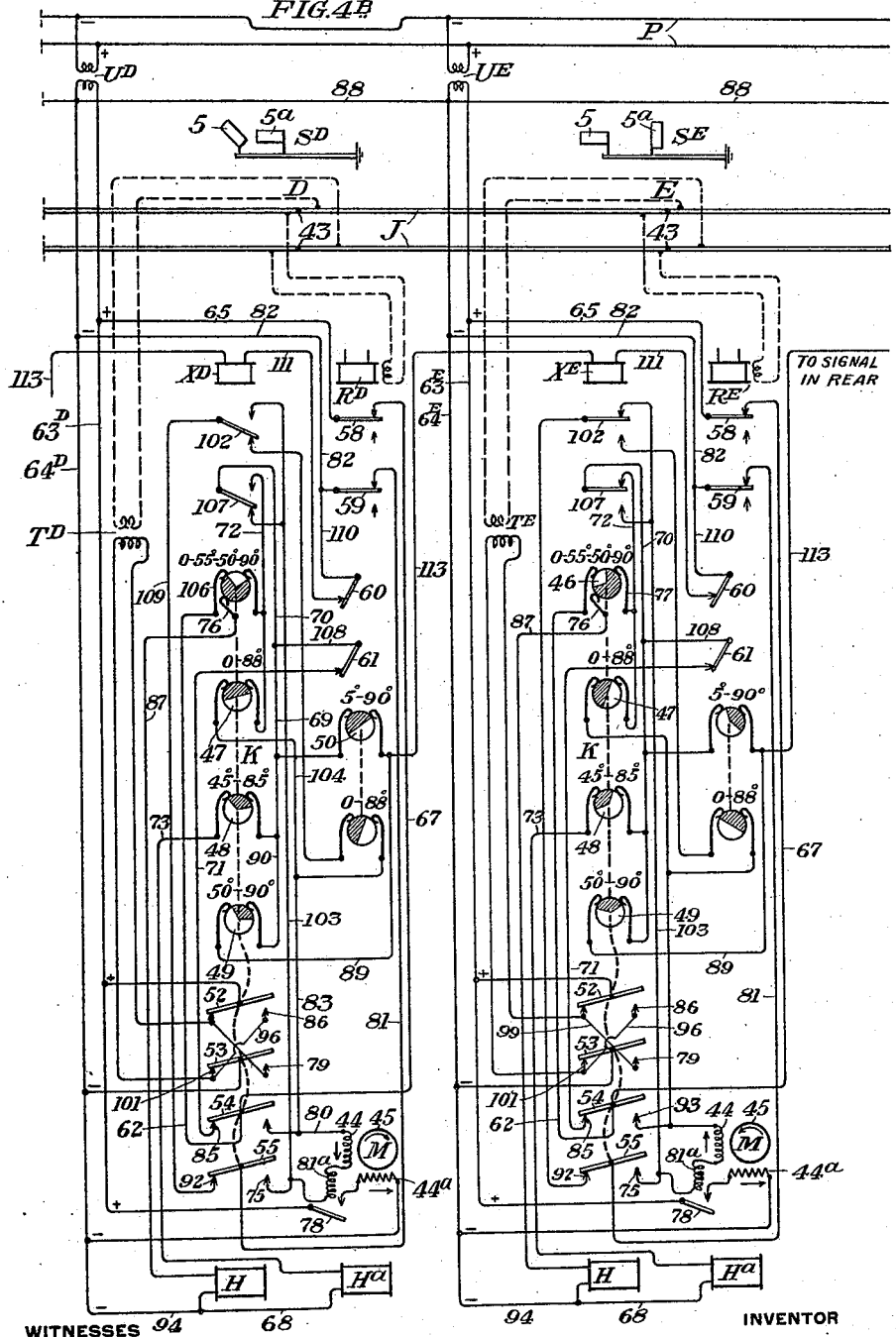

1,414,143.

Patented Apr. 25, 1922.
5 SHEETS—SHEET 5.

INVENTOR:
William H. McClelland, Jr.
by A. L. Vencill,
His Att'y.

UNITED STATES PATENT OFFICE.

WILLIAM H. McCLELLAND, JR., OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING.

1,414,143.      Specification of Letters Patent.      Patented Apr. 25, 1922.

Application filed March 13, 1918. Serial No. 222,112.

*To all whom it may concern:*

Be it known that I, WILLIAM H. MCCLELLAND, Jr., a citizen of the United States, residing at Wilkinsburg, in the county of Allegheny and State of Pennsylvania, have invented certain new and useful Improvements in Railway Signaling, of which the following is a specification.

My invention relates to railway signaling. One feature of my invention is the provision of a novel and improved form of signal mechanism capable of giving four or more distinct indications.

Another feature of my invention is the provision of a railway signaling system suitable for use with such a signal mechanism.

I will describe one form of signal mechanism embodying my invention, and also one form of signaling system embodying my invention, and will then point out the novel features thereof in claims.

Figure 5:
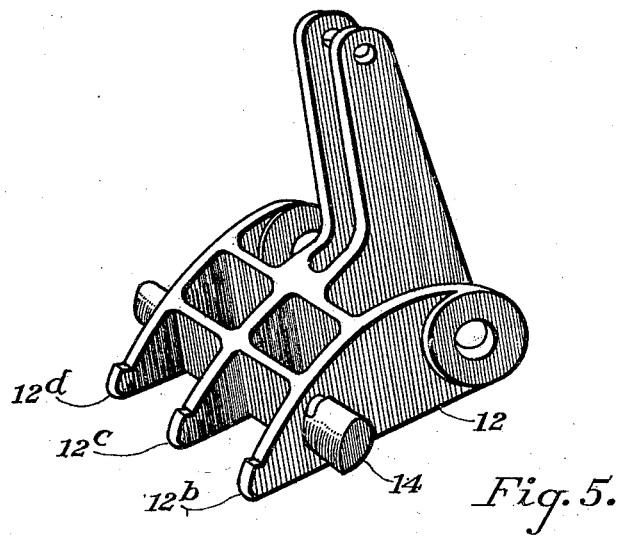
Figure 6:
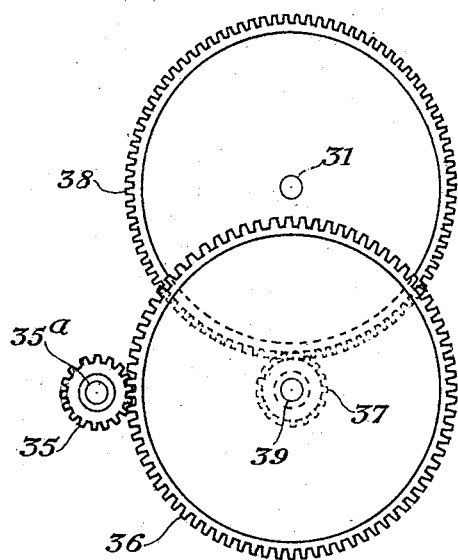

In the accompanying drawings, Fig. 1 is a view showing in side elevation one form of signal mechanism embodying my invention. Fig. 2 is a view showing in end elevation the mechanism shown in Fig. 1. Fig. 3 is a sectional view of a directional clutch F$^a$, taken on the line III—III of Fig. 2 looking in the direction of the arrow. Figs. 4$^A$ and 4$^B$ are diagrammatic views showing one form of railway signaling system employing the signal mechanism shown in Fig. 1, and also embodying my invention. Fig. 5 is a perspective view of a three-pronged fork 12 shown in Figs. 1 and 2. Fig. 6 is a view showing the gears on the left hand side of the mechanism as illustrated in Fig. 2.

Similar reference characters refer to similar parts in each of the several views.

Referring first to Figs. 1 and 2, the reference character 1 designates a suitable frame carrying a pivot pin 3 on which are pivotally mounted two operating arms 2 and 2$^a$, these arms being located side by side and arm 2$^a$ being behind arm 2 as viewed in Fig. 1. The arms 2 and 2$^a$ are operatively connected with two semaphore blades by means of two vertically movable rods 6 and 6$^a$ respectively, these blades being designated 5 and 5$^a$, respectively, in Figs. 4$^A$ and 4$^B$. Rod 6 is pivotally connected with the operating arm 2 by a pin 4, and the other rod 6$^a$ is similarly connected with the other arm 2$^a$ by a pin which is not shown. Each operating arm is biased, by its own weight and by the weight of the corresponding semaphore blade and connecting rod, to a lowest position, which position is indicated in dash lines in Fig. 1, and which position corresponds to the horizontal or zero position of the semaphore blade.

The operating arm 2 may be swung upwardly about its pivotal axis 3 to an intermediate position by a chain 7, in which position it may be latched by a hook 9$^a$ on a latching member 9. This is the position in which this arm is shown in solid lines in Fig. 1. This arm may be swung still further upwardly to a highest position by another chain 7$^a$, in which position it may be latched by a second hook 9$^b$ on the latching member 9. The intermediate position of arm 2 corresponds to the inclined or 45° position of the semaphore blade 5 (Figs. 4$^A$ and 4$^B$) to which this arm is attached, and the highest position of the operating arm corresponds to the vertical or 90° position of this semaphore blade.

In a similar manner the operating arm 2$^a$ may be raised from its lowest position to an intermediate position by a chain 8 (Fig. 2) and may be held in such position by a lower hook on a latching member 10 which is shown in end elevation in Fig. 2 but is directly behind the similar member 9 in Fig. 1. This arm may be further raised to its highest position by a chain 8$^a$ (Fig. 2) and held there by an upper hook on latching member 10. This latter position of arm 2$^a$ is the position in which it is shown in Fig. 1. The lowest, intermediate and highest positions of arm 2$^a$ correspond to the horizontal, inclined and vertical positions of the semaphore blade 5$^a$ (Figs. 4$^A$ and 4$^B$) to which this arm is attached.

The manner in which the chains 7, 7$^a$, 8 and 8$^a$ are mounted, and the means by which they are operated, will be explained hereinafter. For the present I will explain the means for operatively connecting the arms with the chains and with the latching members.

The operating arm 2 carries a pivot pin 11 on which a three-pronged fork 12 is mounted to swing. This fork is illustrated in perspective in Fig. 5. The first and second prongs 12$^b$ and 12$^c$ of this fork straddle chain 7, while the second and third prongs 12$^c$ and 12$^d$ straddle chain 7$^a$, which is offset from chain 7 as shown in Fig. 2. The prongs on this fork co-operate with rollers 13 on chains 7 and 7$^a$. The two outside prongs are provided with shoulders 14 which are adapted to rest on the hooks 9$^a$ and 9$^b$ of latching member 9, this member comprising two arms as shown in Fig. 2, which arms are just outside of the two outer fork prongs respectively. Each arm of member 9 is provided with hooks 9$^a$ and 9$^b$.

The latching member 9 is pivotally mounted on a pin 21 so that it can move into and out of the path of shoulders 14, and is biased into this path by a spring 22 anchored on a pin 23.

When fork 12 is in the position in which it is shown in Fig. 1 with relation to arm 2, the prongs are in the paths of the chain rollers, and the shoulders 14 are in position to catch on hooks 9$^a$ and 9$^b$. This I will term the operative position of the fork. When not held in this operative position, the fork may swing upwardly with relation to arm 2 so that it will not co-operate with the chain rollers or the latching members. The fork may be held rigidly in its operative position by an electromagnet H mounted on the arm and the armature of which is operatively connected with the jaw through a toggle mechanism designated generally by 16. It is sufficient to say that when the electro-magnet H is energized it will hold fork 12 in the operative position, but when the electromagnet is de-energized the fork is free to swing upwardly out of its operative position.

Operating arm 2$^a$ is similarly provided with a three-pronged fork 12$^a$ co-operating with rollers 13 on chains 8 and 8$^a$, and with the hooks on the double latching member 10, this fork being controlled by an electromagnet H$^a$ through the medium of a mechanism 16$^a$.

The frame 1 carries a circuit controller K which is operated by links 20 and 20$^a$ connected with arms 2 and 2$^a$ respectively.

The downward movements of arms 2 and 2$^a$ are cushioned by dash pots in the usual manner, only one of these dash pots, designated 24, being shown in Fig. 1.

Chain 7$^a$ operates between two sprocket wheels 25 and 26, mounted on rods 27 and 28 respectively. Chain 7 operates between a sprocket wheel 26$^a$ which is integral with wheel 26, and a sprocket wheel 29 fixed to a sleeve 30, which sleeve is mounted to rotate freely on a shaft 31 journalled in the frame 1.

Chain 8$^a$ is similarly carried by sprocket wheels 32 and 33; while chain 8 is carried by a sprocket wheel 33$^a$ integral with wheel 33, and a sprocket wheel 34 which is fixed to the shaft 31.

It will now be clear that if sprocket wheel 29 be rotated in counter-clockwise direction as viewed in Fig. 1, both chains 7 and 7$^a$ will be operated in the proper direction to raise arm 2; and likewise that rotation of sprocket wheel 34 in the same direction will operate chains 8 and 8$^a$ in such direction as to raise arm 2$^a$. These two sprocket wheels are operated by a motor M through the medium of mechanism so arranged that one sprocket 29 or the other sprocket 34 is rotated according as the motor rotates in one direction or the other, the direction in which the two sprockets are rotated, however, being the same. This mechanism is as follows.

The motor M is provided with a shaft 35$^a$ which carries a spur gear 35 (Figs. 2 and 6) which meshes with a gear wheel 36. Integral with wheel 36 is a spur gear 37 meshing with a gear wheel 38, which wheel is connected with the shaft 31 through a directional clutch F$^a$. This clutch is so arranged (see Fig. 3) that it connects wheel 38 and shaft 31 for rotation in counter-clockwise direction as viewed in Figs. 1 and 3, but that it permits rotation of wheel 38 in the other direction without causing rotation of the shaft. Consequently, when motor M rotates in counter-clockwise direction as viewed in Fig. 1, it drives sprocket wheel 34 in such direction as to raise arm 2$^a$.

Gear wheel 36 and spur gear 37 are fixed to a shaft 39 which passes through the frame and carries at its opposite end a pinion 40. This latter pinion meshes with an idler pinion 41 which in turn meshes with a gear wheel 42 mounted to rotate freely on shaft 31. Interposed between wheel 42 and sleeve 30 is a directional clutch F which connects these two members only when wheel 42 rotates in counterclockwise direction as viewed in Fig. 1. Consequently, when motor M rotates in clockwise direction as viewed in Fig. 1, sprocket wheel 29 is rotated in the proper direction to raise operating arm 2.

To sum up the foregoing, when motor M is rotating, gear wheels 38 and 42 are rotated in opposite directions, because of the idler pinion 41, and the gear wheel which is rotating in counterclockwise direction as viewed in Fig. 1 is connected through its adjacent clutch F$^a$ or F with its corresponding sprocket wheel 34 or 29. Arm 2$^a$ or arm 2 is raised, then, depending on the direction of rotation of the motor.

It is, of course, understood that when arm 2 is in its lowest position and chains 7 and 7$^a$ are operated, the arm will be raised or not according as magnet H is energized or not, and that if the chains stop when the arm reaches its intermediate position it will be retained in this position by latch hook $9^a$ as long as magnet H continues to be energized. The further operation of arm 2, and the operation of arm $2^a$, will be understood without explanation. I desire to point out, however, that by virtue of the structure of the signal mechanism, either semaphore blade may be raised to its inclined or to its vertical position and may then be held there while the other blade is subsequently raised to its inclined or vertical position.

Referring now to Figs. $4^A$ and $4^B$, I have here shown a stretch of railway track comprising the usual track rails J, divided into block sections A—B, B—C, etc., by insulated joints 43. Each section is provided with a signal, designated by the reference character S with an exponent corresponding to the location, each of which signals comprises a signal mechanism like that shown in the preceding views, and two semaphore blades 5 and $5^a$ operatively connected with the arms 2 and $2^a$ of the mechanism. The motor M in each mechanism is, as here shown, of the induction type, comprising a rotor 45 and two stator windings 44 and $44^a$. The circuit controller K of each mechanism comprises a group of contacts 46, 47, 48 and 49 operatively connected with blade 5 (and arm 2), which contacts are closed during the arc of travel of the blade indicated adjacent each contact. Each circuit controller also comprises a group of contacts 50 and 51 operated by blade $5^a$ (and arm $2^a$), and four reversible contacts 52, 53, 54 and 55 operated by blade 5 (arm 2). As for the legends indicating the arc of travel of each of the circuit controlling contacts 46 to 51 inclusive, it is understood that the horizontal position of each blade is the same as the 0° position, the inclined position is the same as the 45° position, and the vertical position is the same as the 90° position. Contacts 52, 53, 54 and 55 are quick-acting, and reverse just as or just before blade 5 reaches the 45° or inclined position while moving upwardly, and just as or a little after this blade reaches the same position while moving downwardly.

Each block section is provided with a track circuit comprising a source of alternating current and a track relay. Each relay is designated by the reference character R with an exponent corresponding to the location of the relay; each of these relays comprises two windings 56 and 57, the former of which is connected with the track rails of the corresponding track section and the latter of which is constantly energized from a source of alternating signaling current N by conductors which are omitted from the drawing for the sake of clearness. When winding 56 is de-energized, contacts 58 and 59 are open and contacts 60 and 61 occupy their middle positions; and when winding 56 is energized, contacts 58 and 59 are closed and contacts 60 and 61 are swung in one direction or the other depending on the polarity of the current in winding 56 with respect to the current in winding 57. Each of these relays is so designed that contacts 58 and 59 do not open during reversal of the polarized contacts 60 and 61. A relay of this character is shown in application by H. S. Loomis filed July 23, 1917, Serial No. 182156.

The immediate source of current for each track circuit is a transformer designated by T with an exponent corresponding to the location. The secondary of each transformer is connected with the track rails of the corresponding section, and the primary is connected with the source N through contacts 52 and 53 of the adjacent signal, which contacts constitute a pole changer, as will appear more clearly hereinafter. The pole-changing contacts 52 and 53 of each signal are connected with wires 74 and 95 respectively, which are in turn connected respectively with wires designated 63 and 64 with exponents corresponding to the adjacent signal, and these wires are connected with the secondary of a transformer which is designated U with a similar exponent. The primaries of transformers U are connected with power mains P, which mains are supplied with current from the generator N.

Each signal is controlled by the adjacent track relay, and also by an auxiliary relay designated by the reference character X with the same exponent as that of the signal which it controls.

Block section A—B is occupied by a car or train W, so that track relay $R^B$ is de-energized, whereby signal $S^B$ indicates "stop", because, as will appear hereinafter, all of the control circuits for this signal pass through the contacts of this relay. Track relay $R^C$ for block section B—C is energized, so that blade 5 of signal $S^C$ is in the inclined position. This blade has been moved to this position by a circuit which will be explained hereinafter, and is held there by magnet H, the circuit for which is from wire $63^c$, through wire 65, contact 58 of relay $R^C$, wire 67, wire 62, contacts 106 and 76, wire 87, magnet H, and wire 94 to wire $64^c$. Signal $S^C$, therefore, indicates "proceed, prepared to stop at next signal". Track relay $R^D$ for block section C—D is energized in such direction that its contacts 60 and 61 are swung to the left. Blade 5 of this signal likewise occupies the inclined position and blade $5^a$ is in the vertical position having been moved there by virtue of a circuit which will be traced hereinafter. Blade 5 is held in the inclined position by magnet H through a circuit which is the same as that just traced for signal $S^C$; blade $5^a$ is held in the vertical position by magnet $H^a$ through a circuit from wire 63$^d$, through wire 65, contact 58, wire 67, contact 54—85, wire 71, contact 61, wire 108, wire 69, controller 48, wire 73, magnet H$^a$, and wires 68 and 94 to wire 64$^d$. Signal S$^D$, therefore, indicates "proceed, prepared to stop at signal S$^B$". Track relay R$^E$ is energized in the same direction as relay R$^D$, but relay X$^E$ is energized for reasons which will appear hereinafter, so that blade 5 of signal S$^E$ has been moved to the vertical position by virtue of a circuit which will be traced hereinafter, and is held in this position by magnet H through the following circuit: From wire 63$^E$, through wire 65, contact 58, wire 67, contact 54—85, wire 71, contact 61, wire 108, wire 70, front point of contact 107, wire 72, contact 77—46—76, wire 87, magnet H, wire 94, to wire 64$^E$. Blade 5 being in the vertical position, the circuit for magnet H$^a$ of this signal is opened at contact 48 so that blade 5$^a$ has dropped to the horizontal position. Signal E, consequently, indicates "proceed".

I will now assume that the car or train W passes out of block section A—B into the section next in advance. Track relay R$^B$ then becomes energized in such direction that its contacts 60 and 61 are swung to the right. The closing of contact 58 of relay R$^B$ causes magnet H of signal S$^B$ to be energized through a circuit which is the same as the circuit hereinbefore traced for magnet H of signal S$^C$. Motor M of signal S$^B$ becomes energized in such direction as to cause operation of blade 5 to the 45° or inclined position. The circuit for winding 44 of this motor is from wire 63$^B$, through wire 65, contact 58, wire 67, contact 54—93, wire 80, winding 44, winding 81$^a$ (which is the usual brake winding on motor M) contact 75—55, wire 81, contact 59, wire 82, to wire 64$^B$. The circuit for winding 44$^a$ of motor M is from wire 63$^B$, through wire 105, contact 78 (which is closed when brake coil 81$^a$ is energized), winding 44$^a$, wire 91 to wire 64$^B$. For convenience in pointing out the direction of rotation of motor M, I will assume that wire 63$^B$ is positive, so that the instantaneous relative directions of currents in motor windings 44 and 44$^a$ are as indicated by the arrows adjacent these windings. The circuit for motor winding 44 is opened at contacts 54—93 and 55—75 when blade 5 reaches the inclined or 45° position, and at the same time the circuit for motor winding 44$^a$ is opened at contact 78, because coil 81$^a$ is de-energized by the opening of the circuit for motor winding 44.

Prior to the movement of blade 5 of signal S$^B$ away from its horizontal position, the circuit for the primary of transformer T$^B$, which supplies track circuit current to block B—C, was from wire 63$^B$, through wire 74, contact 52—86, wire 96, wire 97, primary of transformer T$^B$, wires 98 and 99, contact 79—53, wire 95 to wire 64$^B$. Upon the reversal of contacts 52 and 53 as blade 5 reaches its inclined position, the primary of transformer T$^B$ is connected with wires 63$^B$, 64$^B$ in the opposite direction, the circuit then being from wire 63$^B$, through wire 74, contact 52—100, wire 98, transformer primary, wire 97, contact 101—53 and wire 95 to wire 64$^B$. This reversal of the connection of transformer T$^B$ causes contacts 60 and 61 of relay R$^C$ to swing to the left so that magnet H$^a$ of signal S$^C$ becomes energized through a circuit which is similar to that which has already been traced for the corresponding magnet of signal S$^D$. Motor M for signal S$^C$ now becomes energized, the circuit for winding 44 being from wire 63$^C$, through wire 65, contact 58, wire 67, contact 54—85, wire 71, contact 61, wires 108 and 70, back point of contact 107, wire 103, winding 81$^a$, winding 44, wires 80, 83 and 84, contact 51, wire 66, back point of contact 102, wire 109, contact 92—55, wire 81, contact 59, wire 82 to wire 64$^C$. The circuit for winding 44$^a$ of this motor is the same as described above for clearing arm 5 on signal S$^B$ to the inclined or 45° position. It will be seen from the arrows adjacent the windings of motor M that the instantaneous relative direction of the current in winding 44 is the reverse of the direction of current in that winding when blade 5 of signal S$^B$ was being moved, consequently, the direction of rotation of motor M of signal S$^C$ is such as to cause blade 5$^a$ to move. When this blade reaches substantially its vertical position, the circuit for winding 44 of motor M is opened at contact 51 and the circuit for winding 44$^a$ is opened at contact 78. The blades of signal S$^C$ are then in the positions in which the blades of signal S$^D$ are shown in the drawing.

The passage of the car or train W out of block section A—B has no effect on relay R$^D$ for block section C—D, but auxiliary relay X$^D$ becomes energized, due to the movement of blade 5$^a$ of signal S$^C$, the circuit for this relay then being from wire C, through wire 65, contact 58, wire 67, contact 54—85, wire 71, contact 61, wires 108, 69, and 112, contact 50 (after blade 5$^a$ has moved to at least the 5° position), wire 113, relay X$^D$, wire 111, contact 60 of relay R$^D$, wires 110 and 82, to wire 64$^D$, thence through wire 88 to wire 64$^C$.

Magnet H of signal S$^D$ continues to be energized, and motor M of this signal now becomes energized in such direction as to move blade 5 from the inclined to the vertical position. The circuit for winding 44 of this motor is from wire 63$^D$, through wire 65, contact 58, wire 67, contact 54—85, wire 71, contact 61, wires 108 and 70, front point of contact 107, wire 72, contact 47, wires 104, 83, and 80, winding 44, winding 81$^a$, wire 103, upper point of contact 102, wire 109, contact 92—55, wire 81, contact 59, wire 82 to 64ᴰ. The circuit for winding 44ᵃ of motor M is the same as described above for moving arm 5 of signal Sᴮ to the inclined or 45° position. It will be observed from the arrows adjacent the windings of motor M for signal Sᴰ that the instantaneous relative polarities of the currents in the windings of this motor are the same as the polarities when the motor was employed to move blade 5 of signal Sᴮ from the horizontal to the inclined position. The motor rotates in the same direction so that blade 5 is carried upward to the vertical position. When the blade reaches substantially this position, the circuit for motor winding 44 is opened at contact 47, and the circuit for winding 44ᵃ is opened at contact 78. The circuit for magnet Hᵃ of signal Sᴰ becomes opened at contact 48 when blade 5 of this signal reaches the 85° position, so that blade 5ᵃ of this signal drops back to the horizontal position. The blades of signal Sᴰ now occupy the positions in which the blades of signal Sᴱ are shown in the drawing.

The movement of the car or train out of block section A—B causes no change in the indication of signal Sᴱ, but the circuit for relay Xᴱ adjacent this signal is transferred from contact 50 of signal Sᴰ to contact 49 of the same signal, the circuit now being from wire 63ᴰ, through wire 65, contact 58, wire 67, contact 54—85, wire 71, contact 61, wires 108, 69, and 90, contact 49, wire 89, wire 113, relay Xᴱ, wire 111, contact 60, wires 110 and 82, to wire 64ᴱ, then by wire 88 to wire 64ᴰ.

Although I have herein shown and described only one form of signal mechanism and only one form of signal system embodying my invention, it is understood that various changes and modifications may be made therein within the scope of the appended claims without departing from the spirit and scope of my invention.

Having thus described my invention, what I claim is:

1. A signal comprising two semaphore blades each biased to one position, a motor operable in either direction for moving each blade to another position, and means including gears for connecting said motor with said blades, there being one more gear in the connection to one blade than in the connection to the other blade.

2. A signal comprising two semaphore blades, two endless chains for controlling said two blades respectively, a motor operable in either direction, and means interposed between said motor and said chains for driving one chain or the other according as the motor operates in one direction or the other.

3. A signal comprising two semaphore blades each biased towards one position, a motor operable in either direction, means interposed between said motor and said blades for moving one blade or the other in opposition to its bias according as the motor operates in one direction or the other, and means distinct from said motor for holding each blade in the position to which it has been moved by the motor, whereby after one blade has been moved to a given position in opposition to its bias it may be held there while the other blade is subsequently moved in opposition to its bias.

4. A signal comprising two semaphore blades each biased towards one position, a motor operable in either direction, two endless chains one for each blade, means interposed between said motor and said chains for operating one chain or the other according as said motor operates in one direction or the other, and electrically controlled means for each blade for connecting the blade to the corresponding chain whereby when such chain is operated it moves the blade in opposition to its bias.

5. A signal comprising two semaphore blades each biased towards one position, a motor operable in either direction, two endless chains one for each blade, means interposed between said motor and said chains for operating one chain or the other according as said motor operates in one direction or the other, and electrically controlled means for each blade for connecting the blade to the corresponding chain to move the blade in opposition to its bias, and for holding the blade in the position to which it has been moved by its chain.

6. A signal comprising two semaphore blades each biased towards one position, a motor operable in either direction, two endless chains one for each blade, gearing interposed between said motor and said chains there being one more gear between the motor and one chain than between the motor and the other chain, two directional clutches one between each chain and the motor whereby one chain or the other is operated according as the motor operates in one direction or the other, and means for operatively connecting each blade to the corresponding chain to move the blade in opposition to its bias.

7. A signal comprising two semaphore blades each biased to one position, two members rotatable in the same direction, means interposed between said members and said blades for moving one blade or the other in opposition to its bias according as one member or the other is rotated, a motor operable in either direction, gearing connecting said motor with said members there being one more gear in the connection to one member than in the connection to the other, and directional clutches between said motor and said members whereby one member or the other is rotated according as the motor operates in one direction or the other.

8. A signal comprising two endless chains, a motor operable in either direction, means interposed between said motor and said chains for driving one chain or the other according as the motor operates in one direction or the other, and signaling means controlled by said chains.

In testimony whereof I affix my signature in presence of two witnesses.

WILLIAM H. McCLELLAND, Jr.

Witnesses:
C. V. HACKMAN,
PHILIP H. JUNG.